United States Patent
Tanabe et al.

(10) Patent No.: US 10,755,557 B2
(45) Date of Patent: Aug. 25, 2020

(54) IN-VEHICLE DEVICE, VEHICLE, NOTIFICATION SYSTEM, AND NOTIFICATION METHOD

(71) Applicant: KYOCERA Corporation, Kyoto (JP)

(72) Inventors: Shigeki Tanabe, Yokohama (JP); Hideki Morita, Yokohama (JP); Isao Masuike, Machida (JP); Shinya Saito, Kawasaki (JP); Tetsushi Wakasa, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/194,432

(22) Filed: Nov. 19, 2018

(65) Prior Publication Data

US 2019/0088115 A1    Mar. 21, 2019

Related U.S. Application Data

(63) Continuation of application No. PCT/JP2017/018293, filed on May 16, 2017.

(30) Foreign Application Priority Data

May 24, 2016    (JP) .................................. 2016-103297

(51) Int. Cl.
  *G08G 1/01*    (2006.01)
  *B60R 21/00*    (2006.01)
  (Continued)

(52) U.S. Cl.
  CPC ............ *G08G 1/0112* (2013.01); *B60R 21/00* (2013.01); *G08G 1/005* (2013.01); *G08G 1/163* (2013.01);
  (Continued)

(58) Field of Classification Search
  CPC .... G08G 1/0112; G08G 1/0116; G08G 1/005; G08G 1/096791; G08G 1/07;
  (Continued)

(56) References Cited

U.S. PATENT DOCUMENTS 5,289,181 A    2/1994 Watanabe et al.
9,091,561 B1    7/2015 Weir
(Continued)

FOREIGN PATENT DOCUMENTS

JP    H04-199500 A    7/1992
JP    2002-056495 A    2/2002
(Continued)

*Primary Examiner* — Emily C Terrell
(74) *Attorney, Agent, or Firm* — Studebaker & Brackett PC

(57) ABSTRACT

An in-vehicle device comprises a communication unit and at least one processor. The communication unit receives first information for detecting proximity of a vehicle to a predetermined area. The at least one processor acquires second information indicating a schedule of changing a travel direction of the vehicle. When the at least one processor detects the proximity of the vehicle to the predetermined area based on the first information received by the communication unit, the at least one processor estimates a route of the vehicle in the predetermined area based on the second information. The at least one processor transmits, using the communication unit, third information to an electronic apparatus located outside the vehicle, the third information for notifying a person getting close to the estimated route of the proximity of the vehicle.

7 Claims, 9 Drawing Sheets

(51) Int. Cl.
  *G08G 1/16* (2006.01)
  *H04W 4/44* (2018.01)
  *G08G 1/005* (2006.01)

(52) U.S. Cl.
  CPC ............. *G08G 1/164* (2013.01); *G08G 1/166* (2013.01); *H04W 4/44* (2018.02)

(58) Field of Classification Search
  CPC ......... H04W 4/40; H04W 4/44; H04W 4/046; H04W 84/12; H04L 49/201
  USPC ........................................................ 340/988
  See application file for complete search history.

(56) References Cited

U.S. PATENT DOCUMENTS

| | | | |
|---|---|---|---|
| 9,505,412 | B2 | 11/2016 | Bai et al. |
| 9,646,496 | B1* | 5/2017 | Miller ...................... G08G 1/07 |
| 10,235,882 | B1* | 3/2019 | Aoude .................. G08G 1/005 |
| 2005/0073438 | A1* | 4/2005 | Rodgers ................ G08G 1/161 340/944 |
| 2010/0100324 | A1 | 4/2010 | Caminiti et al. |
| 2013/0141576 | A1* | 6/2013 | Lord ........................ G08G 1/04 348/148 |
| 2014/0051346 | A1* | 2/2014 | Li ......................... H04W 4/046 455/3.01 |
| 2014/0112538 | A1 | 4/2014 | Ogawa et al. |
| 2014/0368716 | A1 | 12/2014 | Maruyama et al. |
| 2015/0035685 | A1 | 2/2015 | Strickland et al. |
| 2015/0091740 | A1 | 4/2015 | Bai et al. |
| 2015/0304817 | A1 | 10/2015 | Yorifuji |
| 2016/0155334 | A1* | 6/2016 | Jansson .................... G08G 1/08 340/906 |
| 2016/0343256 | A1* | 11/2016 | Song ...................... H04W 4/029 |
| 2017/0011625 | A1* | 1/2017 | Stelzig ................. G08G 1/0133 |
| 2017/0268896 | A1* | 9/2017 | Bai ........................ G01C 21/36 |
| 2018/0181091 | A1* | 6/2018 | Funk ...................... G08G 1/095 |

FOREIGN PATENT DOCUMENTS

| | | |
|---|---|---|
| JP | 2003240569 A | 8/2003 |
| JP | 2005-004542 A | 1/2005 |
| JP | 2006103602 A | 4/2006 |
| JP | 2006-343480 A | 12/2006 |
| JP | 2008-217120 A | 9/2008 |
| JP | 2009-098854 A | 5/2009 |
| JP | 2011138250 A | 7/2011 |
| JP | 2012-252645 A | 12/2012 |
| JP | 2013-131143 A | 7/2013 |
| JP | 2013137606 A | 7/2013 |
| JP | 2013-239853 A | 11/2013 |
| JP | 2014-017865 A | 1/2014 |
| JP | 2014-164484 A | 9/2014 |
| JP | 2015-210170 A | 11/2015 |
| JP | 2015-219641 A | 12/2015 |

\* cited by examiner

IN-VEHICLE DEVICE, VEHICLE, NOTIFICATION SYSTEM, AND NOTIFICATION METHOD

CROSS-REFERENCE TO RELATED APPLICATION

The present application is a continuation based on PCT Application No. PCT/JP2017/018293 filed on May 16, 2017, which claims the benefit of Japanese Application No. 2016-103297, filed on May 24, 2016. PCT Application No. PCT/JP2017/018293 is entitled "IN-VEHICLE DEVICE, VEHICLE, NOTIFICATION SYSTEM, AND NOTIFICATION METHOD", and Japanese Application No. 2016-103297 is entitled "IN-VEHICLE DEVICE, VEHICLE, NOTIFICATION SYSTEM, AND NOTIFICATION METHOD". The contents of which are incorporated by reference herein in their entirety.

FIELD

Embodiments of the present disclosure relate to a notification technique.

BACKGROUND

There is conventionally a notification device mounted on a vehicle for transmitting a notification of proximity of the vehicle to the outside of the vehicle.

SUMMARY

In one embodiment, an in-vehicle device comprises a communication unit configured to receive first information for detecting proximity of a vehicle to a predetermined area and at least one processor configured to acquire second information indicating a schedule of changing a travel direction of the vehicle. When the at least one processor detects the proximity of the vehicle to the predetermined area based on the first information received by the communication unit, the at least one processor estimates a route of the vehicle in the predetermined area based on the second information. The at least one processor transmits, using the communication unit, third information to an electronic apparatus located outside the vehicle, the third information for notifying a person getting close to the estimated route of the proximity of the vehicle.

In one embodiment, a vehicle comprises a communication unit configured to receive first information for detecting proximity of a vehicle to a predetermined area and at least one processor configured to acquire second information indicating a schedule of changing a travel direction of the vehicle. When the at least one processor detects the proximity of the vehicle to the predetermined area based on the first information received by the communication unit, the at least one processor estimates a route of the vehicle in the predetermined area based on the second information. The at least one processor transmits, using the communication unit, third information to an electronic apparatus located outside the vehicle, the third information for notifying a person getting close to the estimated route of the proximity of the vehicle.

In one embodiment, a notification system is a notification system comprising an in-vehicle device mounted on a vehicle and an electronic apparatus located outside the vehicle and configured to communicate with the in-vehicle device. The in-vehicle device comprises a first communication unit configured to receive first information for detecting proximity of a vehicle to a predetermined area and at least one first processor configured to acquire second information indicating a schedule of changing a travel direction of the vehicle. When the at least one first processor detects the proximity of the vehicle to the predetermined area based on the first information received by the first communication unit, the at least one first processor estimates a route of the vehicle in the predetermined area based on the second information. The at least one first processor transmits, using the communication unit, third information to an electronic apparatus, the third information for notifying a person getting close to the estimated route of the proximity of the vehicle. The electronic apparatus comprises a second communication unit configured to receive the third information from the in-vehicle device and at least one second processor configured to execute notification processing based on the third information.

In one embodiment, a notification method is a notification method performed by an in-vehicle device comprising a communication unit mounted on a vehicle. The notification method comprises receiving first information, from the communication unit, for detecting proximity of the vehicle to a predetermined area. The notification method comprises acquiring second information indicating a schedule of changing a travel direction of the vehicle. The notification method comprises estimating a route of the vehicle in the predetermined area based on the second information when the proximity of the vehicle to the predetermined area is detected based on the first information. The notification method comprises transmitting third information, using the communication unit, to an electronic apparatus located outside the vehicle, the third information for notifying a person getting close to the estimated route of the proximity of the vehicle.

DETAILED DESCRIPTION

Figure 1:
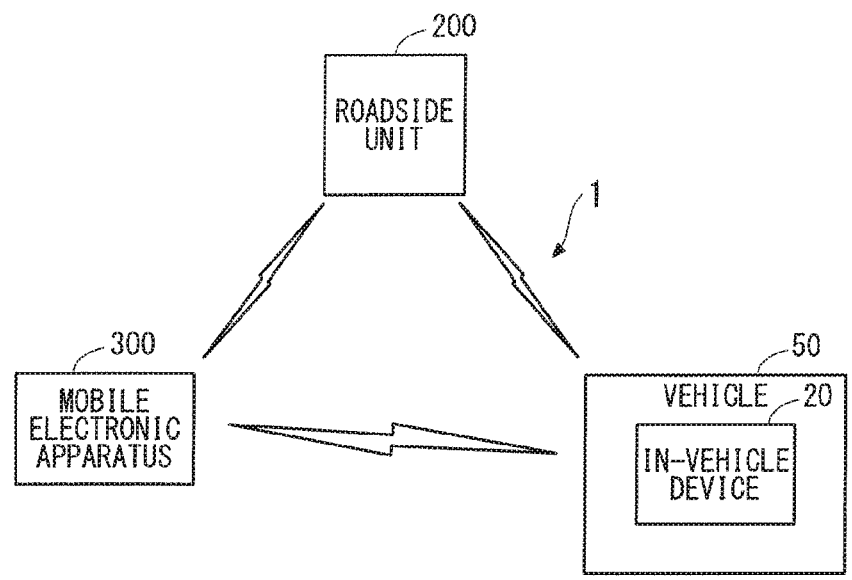
FIG. 1 illustrates a system diagram showing one example of a system configuration of a notification system.

One example of a plurality of embodiments for implementing an in-vehicle device, a vehicle, a notification system, and a notification method according to the present disclosure will be described in detail with reference to the drawings. The same reference numerals may be assigned to the similar constituent element in some cases in the description hereinafter. Furthermore, a repetitive description may be omitted in some cases.

FIG. 1 is a system diagram showing one example of a system configuration of a notification system 1. A configuration of the notification system 1 according to one example of a plurality of embodiments is described with reference to FIG. 1.

As shown in FIG. 1, the notification system 1 comprises a vehicle 50, a roadside unit 200, and a mobile electronic apparatus 300. The vehicle 50 includes, for example, a car, a truck, a bus, a taxi, and an emergency vehicle. The vehicle 50 comprises an in-vehicle device 20. The in-vehicle device 20 is mounted on the vehicle 50 so as to be able to receive a radio wave from the roadside unit 200, for example. The in-vehicle device 20 includes an in-vehicle device such as a navigation device, an electronic toll collection system (ETC) in-vehicle apparatus, a combination meter, and a car audio, for example, mounted on the vehicle 50. The in-vehicle device 20 may be an electronic apparatus brought into the vehicle 50 by a driver, for example. The electronic apparatus brought into the vehicle 50 includes, for example, a smartphone, a mobile phone, a wearable device, and a mobile game machine. The roadside unit 200 is located in a predetermined area or near the predetermined area. The predetermined area includes, for example, an area of a road, an intersection, and a parking area. The predetermined area may include a location where there is a possibility of occurrence of a traffic accident, for example. The roadside unit 200 can transmit a radio wave to an unspecified large number of electronic apparatuses in and near the predetermined area. A person takes along the mobile electronic apparatus 300. The person includes, for example, a pedestrian and a person traveling by bicycle. In the description hereinafter, the in-vehicle device 20, the roadside unit 200, and the mobile electronic apparatus 300 may be referred to as "the subject apparatus" in some cases. The vehicle 50 may be referred to as "the subject vehicle" in some cases.

Each of the in-vehicle device 20, the roadside unit 200, and the mobile electronic apparatus 300 comprises a communication unit. The in-vehicle device 20, the roadside unit 200, and the mobile electronic apparatus 300 can perform an interactive communication with each other via the communication unit. The in-vehicle device 20 includes, for example, information for guiding the vehicle 50 to a destination and a navigation function of providing a driver with information regarding a surrounding area of the vehicle 50. The roadside unit 200 includes a function of transmitting information regarding a predetermined area 100. The mobile electronic apparatus 300 includes a function of providing a user with information received from the in-vehicle device 20 and the roadside unit 200, for example.

Figure 2:
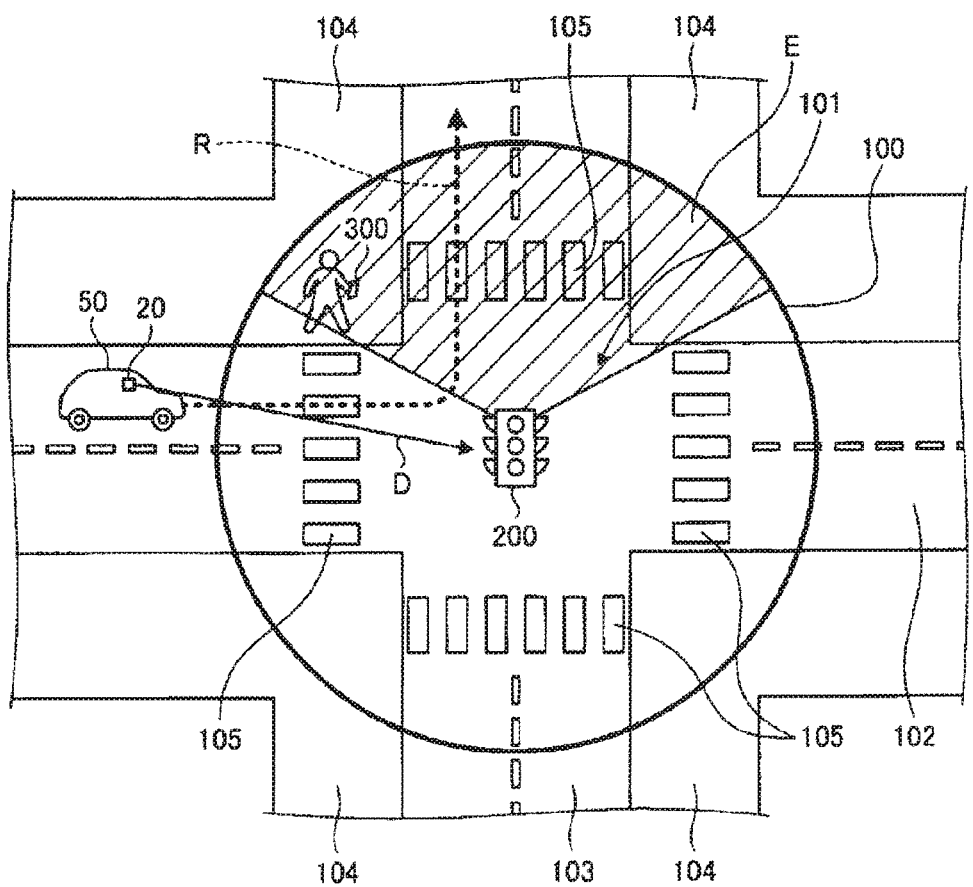
FIG. 2 illustrates a diagram showing one example of a notification method of the notification system in a predetermined area.

FIG. 2 is a diagram showing one example of a notification method of the notification system 1 in the predetermined area 100 in the example shown in FIG. 2, the predetermined area 100 is an area including an intersection 101. The intersection 101 includes an area where a road 102 and a road 103 intersect with each other. A sidewalk 104 is located along the road 102 and the road 103. A crosswalk 105 is located on the road 102 and the road 103 near the intersection 101. The example in FIG. 2 shows a case where one roadside unit 200 is provided in the intersection 101, however, a plurality of roadside units 200 may be provided in the intersection 101.

In the example shown in FIG. 2, the vehicle 50 travels along the road 102 toward the predetermined area 100. The in-vehicle device 20 determines that the vehicle 50 gets close to the predetermined area 100 (the intersection 101) upon receiving the radio wave from the roadside unit 200. In this case, the in-vehicle device 20 estimates a scheduled route R of the vehicle 50 in the predetermined area 100 to which the vehicle 50 gets close. For example, the in-vehicle device 20 estimates the scheduled route R in the predetermined area 100 based on route data indicating a guide route of the vehicle 50 to the destination acquired by a navigation function and a current position of the vehicle 50. In the example shown in FIG. 2, the route data includes information indicating a route that the vehicle 50 turns left at the intersection 101 from the road 102. In this case, the in-vehicle device 20 can estimate that the scheduled route R of the vehicle 50 at the intersection 101 in the predetermined area 100 is the route that the vehicle 50 turns left from the road 102 to the road 103. The in-vehicle device 20 transmits third information D for notifying a person getting close to the estimated scheduled route R of the proximity of the vehicle 50 to the roadside unit 200. For example, the third information D includes information indicating the estimated scheduled route R and the current position of the vehicle 50, for example. For example, the in-vehicle device 20 may transmit the third information D to the roadside unit 200 based on identification information received from the roadside unit 200. For example, the in-vehicle device 20 may simultaneously transmit the third information D as a broadcast message.

Upon receiving the third information D from the in-vehicle device 20 of the vehicle 50, the roadside unit 200 determines a notification area E in the predetermined area 100 based on the scheduled route R indicated by the third information D. For example, determined as the notification area E is an area including the sidewalk 104 near an area where a travel direction of the vehicle 50 is scheduled to be changed. For example, the notification area E includes an area where the notification can be transmitted to a person who has a possibility of crossing the scheduled route R For example, the roadside unit 200 determines the notification area F including the road 103, the sidewalk 104, and the crosswalk 105 located in the scheduled route R, for example. The roadside unit 200 sends out the radio wave containing the notification information to the determined notification area E. The notification information includes information for making the other electronic apparatus in the notification area E transmit the notification of the proximity of the vehicle 50.

In the example shown in FIG. 2, the mobile electronic apparatus 300 which the person takes along is located in the notification area E. In this case, upon receiving the radio wave containing the notification information from the roadside unit 200, the mobile electronic apparatus 300 notifies the person having the mobile electronic apparatus 300 of the proximity of the vehicle 50 which is to turn left at the intersection 101 based on the notification information.

As described above, if the in-vehicle device 20 gets close to the predetermined area 100, the notification system 1 can transmit, to the roadside unit 200 located outside the vehicle 50, the third information D for transmitting the notification to the person who gets close to the scheduled route R of the vehicle 50 in the estimated predetermined area 100. The notification system 1 can notify the person near the scheduled route R of the proximity of the vehicle 50 using the roadside unit 200. For example, if the vehicle 50 is a hybrid car or an electric car, a traveling sound while the vehicle 50 travels is small, so that the person has difficulty recognizing the proximity of the vehicle 50. Thus, the notification system 1 previously transmits, using the in-vehicle device 20, the notification of the scheduled route R of the vehicle 50 to the roadside unit 200, thereby being able to contribute to a suppression of an accidental contact between the vehicle 50 and the person. For example, if a speed of the vehicle 50 is high, the person is previously notified of the scheduled route R, thereby being able to suppress a collision with the vehicle 50. Furthermore, the roadside unit 200 specifies the notification area E, thus the notification system 1 can deter the notification to the person who is not associated with the scheduled route R.

Figure 3:
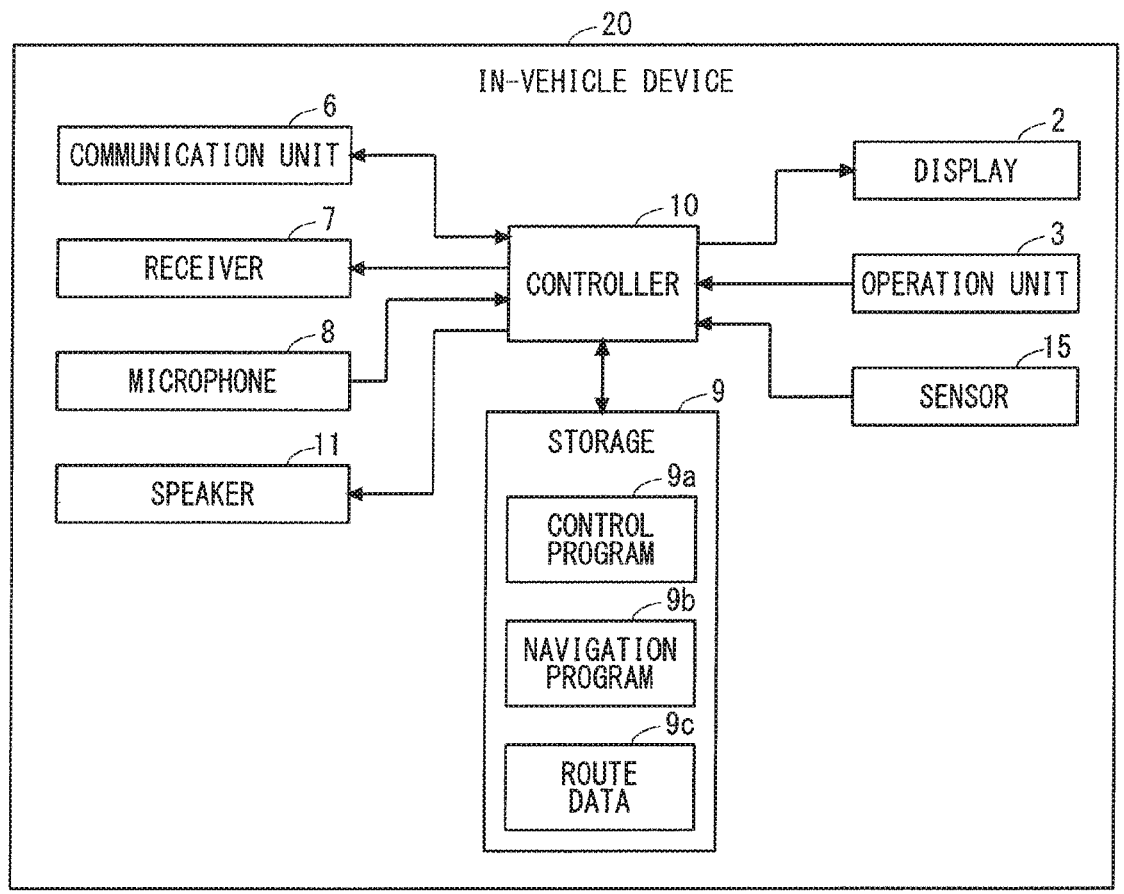
FIG. 3 illustrates a block diagram showing one example of a function configuration of an in-vehicle device.

FIG. 3 is a block diagram showing one example of a function configuration of the in-vehicle device 20. As shown in FIG. 3, the in-vehicle device 20 comprises a display 2, an operation unit 3, a communication unit 6, a receiver 7, a microphone 8, a storage 9, a controller 10, a speaker 11, and a sensor 15.

The display 2 has a display panel of a liquid crystal display or an organic electro-luminescence display, for example. The display 2 can display information of characters, graphics, and images, for example, in accordance with a signal being input from the controller 10.

The operation unit 3 has one or a plurality of devices for receiving an operation performed by the driver. The device for receiving the operation performed by the driver includes, for example, a key, a button, and a touch screen. The operator 3 can input a signal according to the received operation to the controller 10.

The communication unit 6 can perform a wireless communication. The communication unit 6 supports wireless communication standards. The wireless communication standards supported by the communication unit 6 include, for example, a communication standard for a cellular phone, such as 2G, 3G, 4G, and 5G, and a communication standard for short-range wireless communication. Examples of the communication standard for a cellular phone include Long Term Evolution (LTE), Wideband Code Division Multiple Access (W-CDMA), Worldwide Interoperability for Microwave Access (WiMAX) (trademark), CDMA2000, Personal Digital Cellular (PDC), Global System for Mobile Communications (GSM) (trademark), and Personal Handy-phone System (PHS). Examples of the communication standard for short-range wireless communication include IEEE802.11 (IEEE is an abbreviated expression of The Institute of Electrical and Electronics Engineers, Inc.), Bluetooth (trademark), Infrared Data Association (IrDA), Near Field Communication (NFC), and Wireless Personal Area Network (WPAN). The communication standard for WPAN includes, for example, ZigBee (trademark), Digital Enhanced Cordless Telecommunications (DECT), Z-Wave, and Wireless Smart Utility Network (WiSun). The communication unit 6 may support a single or a plurality of the communication standards described above.

The communication unit 6 further supports a plurality of communication standards for enabling communication with the roadside unit 200, for example. The communication standards include, for example, Dedicated Short Range Communication (DSRC) enabling the interactive communication. In one example of one embodiment, the communication unit 6 can receive a radio wave transmitted from the roadside unit 200 in a communication area of the roadside unit 200. The communication unit 6 can transmit a radio wave which can be received by the roadside unit 200 and the mobile electronic apparatus 300, for example. The communication area includes an area equivalent to the predetermined area 100 and an area larger than the predetermined area 100, for example.

The communication unit 6 can receive a radio signal of a predetermined frequency band from a global positioning system (GPS) satellite, perform demodulation processing on the received radio signal, and input the signal which has been processed to the controller 10. The communication unit 6 may receive a radio signal of a predetermined frequency band from a positioning satellite other than the GPS satellite, perform demodulation processing on the received radio signal, and input the signal which has been processed to the controller 10. The communication unit 6 may receive a radio signal of a predetermined frequency band from a plural types of positioning satellites, perform demodulation processing on the received radio signal, and input the signal which has been processed to the controller 10. In the in-vehicle device 20, it is also applicable to separate the function of communicating with the positioning satellite from the communication unit 6 and provide a separate communication unit independent from the communication unit 6.

The communication unit can communicate with an electronic control unit (ECU) and the other in-vehicle device mounted on the vehicle 50 via an in-vehicle network of the vehicle 50. For example, upon receiving instruction information indicating an instruction state of a direction indicator of the vehicle 50 from a direction instruction control device, the communication unit 6 inputs the instruction information to the controller 10. The direction instruction control device can control a blinking/lights-out of the direction indicator of the vehicle 50 in accordance with an operation of a direction selection switch performed by the driver, for example. For example, upon receiving angle information indicating an operation angle of a steering of the vehicle 50 from the ECU, the communication unit 6 inputs the angle information to the controller 10. The ECU can detect a steering angle of the steering using a steering angle sensor, for example.

The receiver 7 and the speaker 11 are sound output units. The receiver 7 and the speaker 11 can output a sound signal being input from the controller 10 as a sound. The microphone 8 is a sound output unit. The microphone 8 can convert a voice of the user into a sound signal and input the sound signal to the controller 10.

The storage 9 can store a program and data. The storage 9 is also used as a workspace in which a processing result of the controller 10 is temporarily stored. The storage 9 may include any non-transitory storage medium such as a semiconductor storage medium and a magnetic storage medium. The storage 9 may include a plural types of storage media. The storage 9 may include a combination of a transportable storage medium such as a memory card, an optical disc, and a magneto-optical disk and a reader for the storage medium. The storage 9 may include a storage device used as such as random access memory (RAM) that is used as a temporary storage area.

The storage 9 stores, for example, a control program 9a, a navigation program 9b, and a route data 9c. The control program 9a can provide functions regarding various types of control to activate the in-vehicle device 20. For example, the control program 9a controls the communication unit 6, thereby achieving the communication with the electronic apparatus such as the roadside unit 200 and the mobile electronic apparatus 300. The function provided by the control program 9a includes a function of making an electronic apparatus located outside the vehicle 50 transmit the notification of the proximity of the vehicle 50 by controlling the communication unit 6. The navigation program 9b provides a function of displaying a map on the display 2 to guide the driver to the destination. The route data 9c includes various types of information such as map information, information regarding a road, and information regarding a public transportation system necessary to guide the vehicle 50 to the destination.

The control program 9a can provide an acquisition function of acquiring second information indicating a schedule of changing the travel direction of the vehicle 50. For example, the acquisition function includes a function of acquiring the second information indicating a route corresponding to the predetermined area 100 from the route data 9c. For example, the acquisition function includes a function of acquiring the second information indicating a direction instruction result and an operation angle of a steering of the vehicle 50 from the other in-vehicle device and the ECU of the vehicle 50 via the communication unit 6. For example, if the vehicle 50 is scheduled to go straight down the intersection 101, the second information may be information indicating that the travel direction of the vehicle 50 is not scheduled to be changed in the predetermined area 100.

The control program 9a can provide an estimation function of estimating the scheduled route R of the vehicle 50 in the predetermined area 100 based on the second information. For example, the estimation function includes a function of estimating a route in the predetermined area 100 from the route of the vehicle 50 to the destination based on the acquired second information. For example, the estimation function includes a function of estimating the scheduled route R in the predetermined area 100 from a history of a route along which the vehicle 50 has moved in the past based on the acquired second information. For example, the estimation function includes a function of specifying a traffic lane along which the vehicle 50 travels from the acquired second information, and estimating a route in the predetermined area 100 based on a type of the traffic lane. The type of the traffic lane includes, for example, a lane for through traffic, a right turn lane, a left turn lane, a lane for through traffic or right turn, and a lane for through traffic or left turn. For example, if the vehicle 50 is located on the right turn lane, it can be estimated that the vehicle 50 has a high possibility of turning right.

The control program 9a can provide a generation function of generating the third information D for notifying a person getting close to the estimated scheduled route R of the proximity of the vehicle 50. For example, the generation function includes a function of generating the third information D including information regarding the scheduled route R, a position of the subject vehicle, and the intersection 101.

The navigation program 9b can provide a function of searching for a route from a start point to a destination. The navigation program 9b can provide a function of controlling a display of the display 2 to guide the vehicle 50 to the destination. The controller 10 executes the navigation program 9b, thereby achieving the function of guiding the vehicle 50 to the destination. For example, if the controller 10 searches for the route from the start point to the destination using the function of the navigation program 9b searching for the route, the controller generates the route data 9c. The navigation program 9b can provide a function of storing the route through which the vehicle 50 has been guided as a history.

The route data 9c includes data regarding the route searched by executing the navigation program 9b. The route data 9c includes history data regarding the history of the route of the vehicle 50. The history data includes, for example, a route along which the vehicle 50 has actually traveled and a date and time when the vehicle 50 has traveled.

The controller 10 includes at least one processor for providing control and processing capability to execute various functions as described in detail below.

In accordance with various embodiments, the at least one processor may be executed as a single integrated circuit (IC) or as multiple communicatively coupled IC's and/or discrete circuits. The at least one processor can be executed in accordance with various known techniques.

In one embodiment, the processor includes one or more circuits or units configurable to perform one or more data computing procedures or processes by executing instructions stored in an associated memory, for example. In the other embodiment, the processor may be firmware configurable to perform one or more data computing procedures or processes (a discrete logic component, for example).

In accordance with various embodiments, the processor may comprise one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described below.

In the present example, the controller 10 includes an arithmetic processing unit. The arithmetic processing unit includes, but not only limited to, a central processing unit (CPU), a system-on-a-chip (SoC), a micro control unit (MCU), a field-programmable gate array (FPGA), and a coprocessor, for example. The controller 10 integrally controls the operation of the in-vehicle device 20 so as to achieve the various functions. The controller 10 may operate in cooperation with the ECU.

The controller 10 executes a command included in a program stored in the storage 9 with reference to the data stored in the storage 9 as necessary. Then, the controller 10 controls the function unit in accordance with the data and the command, thereby achieving the various functions. The function unit includes, for example, the display 2, the communication unit 6, the receiver 7, the speaker 11, and the sensor 15, but is not limited thereto. The controller 10 may change the control in accordance with the detection result of the detection unit in some cases. The detection unit includes, for example, the operation unit 3, the communication unit 6, and the microphone 8, but is not limited thereto.

The controller 10 executes the control program 9a, thereby executing the operation of the in-vehicle device 20 in the notification method shown in FIG. 2.

The sensor 15 includes a plurality of sensors. For example, the plurality of sensors include sensors such as an accelerometer, an azimuth sensor, and a gyro sensor. The accelerometer can detect a direction and a magnitude of acceleration acting on the subject apparatus. The azimuth sensor can detect a direction of earth magnetism. The gyro sensor can detect an angle and an angular speed of the subject apparatus. The sensor 15 inputs the detection result to the controller 10. The detection result of the sensor 15 may be used in combination to detect the change in the travel direction of the vehicle 50. The controller 10 can use the detection result of the gyro sensor to detect the change in the travel direction and right or left turn of the vehicle 50, for example.

Figure 4:
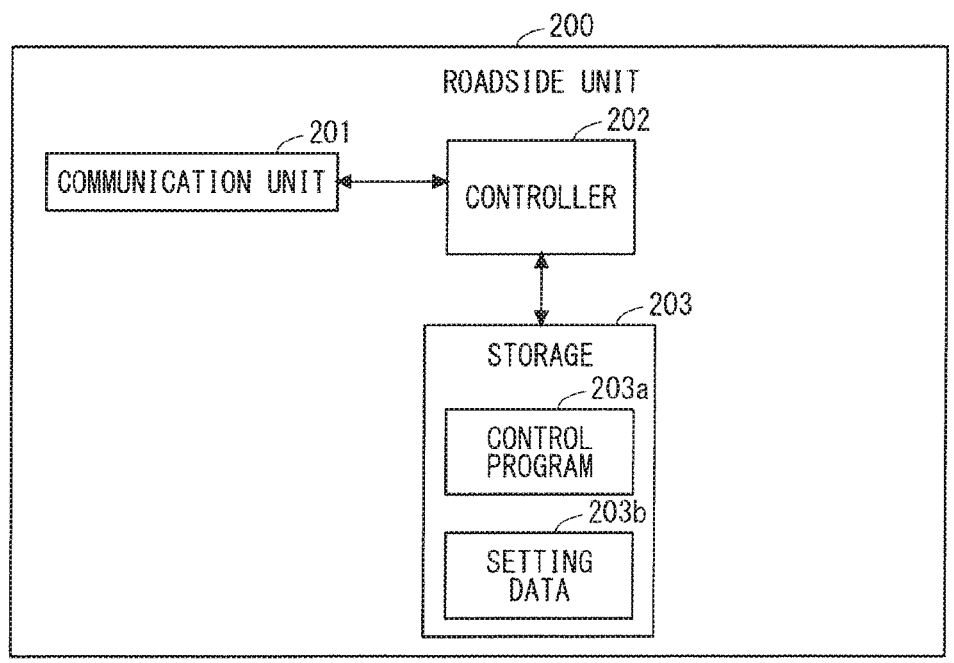
FIG. 4 illustrates a block diagram showing one example of a function configuration of a roadside unit.

FIG. 4 is a block diagram showing one example of a function configuration of the roadside unit 200. As shown in FIG. 4, the roadside unit 200 comprises a communication unit 201, a controller 202, and a storage 203.

The communication unit 201 can perform a wireless communication. A communication system supported by the communication unit 201 is a wireless communication standard. Examples of the wireless communication standard include Worldwide Interoperability for Microwave Access (WiMAX) (trademark), IEEE802.11 (including a, b, n, and p), Bluetooth (trademark), Infrared Data Association (IrDA), and Near Field. Communication (NFC). The wireless communication standard further includes, for example, a communication standard for a cellular phone, such as 2G, 3G, and 4G. Examples of the communication standard for a cellular phone include Long Term Evolution (LIE), Wideband Code Division Multiple Access (W-CDMA), CDMA2000, Personal Digital Cellular (PDC), Global System for Mobile Communications (GSM) (trademark), and Personal Handy-phone System (PHS). The communication unit 201 may support a single or a plurality of the communication standards described above. The communication unit 201 may support a wire communication. The wire communication includes, for example, Ethernet (trademark) and fiber channel. The communication unit 201 can communicate with the other roadside unit 200, a traffic light, and a server, for example.

The communication unit 201 further supports a plurality of communication standards for enabling communication with the in-vehicle device 20, for example. The communication standards include, for example, DSRC enabling the interactive communication. In one example of one embodiment, the communication unit 201 can send out the radio wave to the communication area. The communication unit 201 can receive the radio wave sent out from the in-vehicle device 20 and the mobile electronic apparatus 300, for example. The communication unit 201 can communicate with a communication device located in the communication area by a near field wireless communication. The communication device includes, for example, the in-vehicle device 20 and the mobile electronic apparatus 300.

The controller 202 includes at least one processor for providing control and processing capability to execute various functions as described in detail below.

In accordance with various embodiments, the at least one processor may be executed as a single integrated circuit (IC) or as multiple communicatively coupled IC's and/or discrete circuits. The at least one processor can be executed in accordance with various known techniques.

In one embodiment, the processor includes one or more circuits or units configurable to perform one or more data computing procedures or processes by executing instructions stored in an associated memory, for example. In the other embodiment, the processor may be firmware configurable to perform one or more data computing procedures or processes (a discrete logic component, for example).

In accordance with various embodiments, the processor may comprise one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described below.

In the present example, the controller 202 includes an arithmetic processing unit. The arithmetic processing unit includes, but not only limited to, a central processing unit (CPU), a system-on-a-chip (SoC), a micro control unit (MCU), and a field-programmable gate array (FPGA), for example. The controller 202 integrally controls the operation of the roadside unit 200 so as to achieve the various functions.

The controller 202 executes a command included in a program stored in the storage 203 with reference to the data stored in the storage 203 as necessary. Then, the controller 202 controls the function unit in accordance with the data and the command, thereby achieving the various functions.

The storage 203 can store a program and data. The storage 203 is also used as a workspace in which a processing result of the controller 202 is temporarily stored. The storage 203 may comprise any non-transitory storage medium such as a semiconductor storage medium and a magnetic storage medium. The storage 203 may include a plural types of storage media. The storage 203 may include a combination of a transportable storage medium such as a memory card, an optical disc, and a magneto-optical disk and a reader for the storage medium. The storage 203 may include a storage device used as such as random access memory (RAM) that is used as a temporary storage area.

The storage 203 stores, for example, a control program 203*a* and setting data 203*b*. The control program 203*a* can provide functions regarding various types of control to activate the roadside unit 200. For example, the control program 203*a* controls the communication unit 201, thereby achieving the communication with the electronic apparatus such as the in-vehicle device 20 and the mobile electronic apparatus 300. The function provided by the control program 203*a* includes a function of controlling communication establishing processing and transmission and reception of data with the communication device located in the communication area. The setting data 203*b* includes information regarding an identification number of the roadside unit 200, a location where the roadside unit 200 is disposed, and the predetermined area 100. The information regarding the predetermined area 100 includes information regarding a road and a position of the predetermined area 100. The storage 203 may store a program for making the roadside unit 200 execute a display control of the traffic light, for example.

The control program 203*a* can provide a function of sending out the radio wave to the in-vehicle device 20 of the vehicle 50 getting close to the predetermined area 100 and the communication device, for example. For example, the radio wave includes information of an identification number of the roadside unit 200, the intersection 101, and the roads 102 and 103. The control program 203*a* can provide a function of specifying the notification area E in the predetermined area 100 based on the third information D received from the in-vehicle device 20. The control program 203*a* can provide a function of sending out the notification information for making the other electronic apparatus in the notification area E transmit the notification of the proximity of the vehicle 50.

The controller 202 executes the control program 203*a*, thereby executing the operation of the roadside unit 200 in the notification method shown in FIG. 2.

Figure 5:
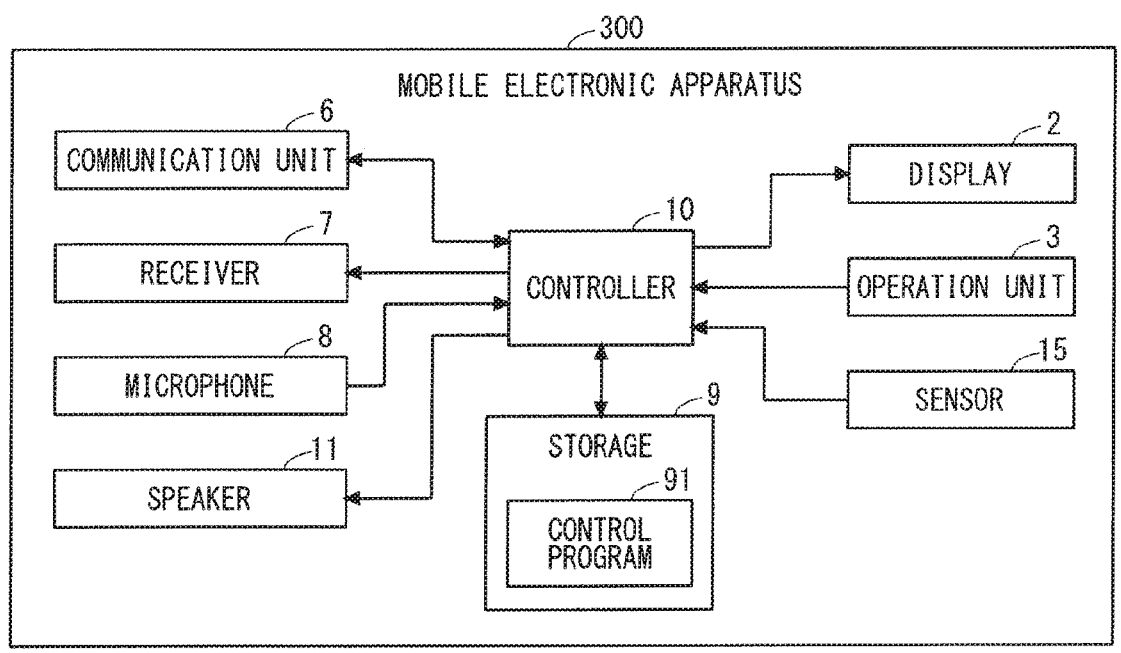
FIG. 5 illustrates a block diagram showing one example of a function configuration of a mobile electronic apparatus.

FIG. 5 is a block diagram showing one example of a function configuration of the mobile electronic apparatus 300. As shown in FIG. 5, the mobile electronic apparatus 300 comprises the display 2, the operation unit 3, the communication unit 6, the receiver 7, the microphone 8, the storage 9, the controller 10, the speaker 11, and the sensor 15.

The communication unit 6 further supports a plurality of communication standards for enabling communication with the in-vehicle device 20 and the roadside unit 200, for example. The communication standards include, for example, DSRC enabling the interactive communication. In one example of one embodiment, the communication unit 6 can receive the radio wave transmitted from the roadside unit 200 in the communication area of the roadside unit 200. The communication unit 6 can transmit the radio wave which can be received by the in-vehicle device 20 and the roadside unit 200, for example.

The communication unit 6 can receive a radio signal having a predetermined frequency band from a GPS satellite, perform demodulation processing on the received radio signal, and input the signal which has been processed to the controller 10. The communication unit 6 may receive a radio signal of a predetermined frequency band from a positioning satellite other than the GPS satellite, perform demodulation processing on the received radio signal, and input the signal which has been processed to the controller 10. The communication unit 6 may receive a radio signal of a predetermined frequency band from a plural types of positioning satellites, perform demodulation processing on the received radio signal, and input the signal which has been processed to the controller 10. In the mobile electronic apparatus 300, it is also applicable to separate the function of communicating with the GPS satellite from the communication unit 6 and provide a separate communication unit independent from the communication unit 6.

The storage 9 can store a control program 91, for example. The control program 91 can provide functions regarding various types of control to activate the mobile electronic apparatus 300. For example, the control program 91 controls the communication unit 6, thereby achieving the communication with the electronic apparatus such as the roadside unit 200 and the in-vehicle device 20. The function provided by the control program 91 includes a function of notifying the user of the proximity of the vehicle 50 in accordance with the transmission of the third information D performed by the in-vehicle device 20 by controlling the communication unit 6.

The controller 10 executes the control program 91, thereby executing the operation of the mobile electronic apparatus 300 in the notification method shown in FIG. 2.

Figure 6:
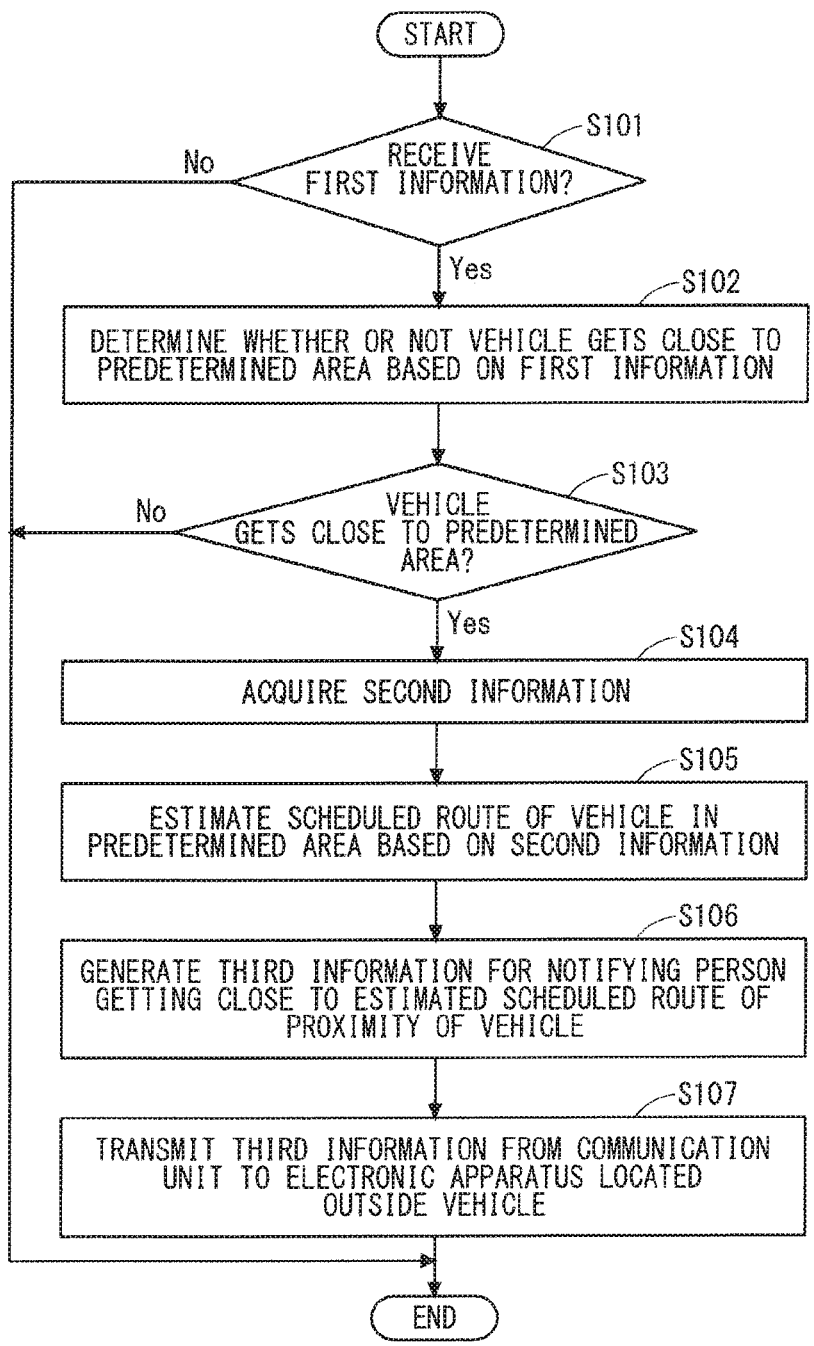
FIG. 6 illustrates a flow chart showing a processing procedure of one example of control performed by the in-vehicle device.

FIG. 6 is a flow chart showing a processing procedure of one example of control performed by the in-vehicle device 20. The processing procedure shown in FIG. 6 is achieved when the controller 10 of the in-vehicle device 20 executes the control program 9a. The processing procedure shown in FIG. 6 is executed repeatedly by the controller 10.

As shown in FIG. 6, the controller 10 of the in-vehicle device 20 determines whether or not the first information is received via the communication unit 6 as Step S101. For example, the first information includes information of the radio wave sent out from the roadside unit 200 and positional information of the vehicle 50 received every predetermined time. If the controller 10 determines that the first information is not received (No in Step S101), the controller 10 finishes the processing procedure shown in FIG. 6. If the controller 10 determines that the first information is received (Yes in Step S101), the controller 10 proceeds with the processing to Step S102.

The controller 10 of the in-vehicle device 20 determines whether or not the vehicle 50 gets close to the predetermined area 100 based on the first information as Step S102. For example, in a case where the first information is radio wave information, if the first information includes the information regarding the predetermined area 100, the controller 10 determines that the vehicle 50 gets close to the predetermined area 100. For example, if a distance from the position of the subject apparatus indicated by the first information to the predetermined area 100 is within a predetermined range, the controller 10 determines that the vehicle 50 gets close to the predetermined area 100. If the controller 10 determines that the vehicle 50 does not get close to the predetermined area 100 (No in Step S103), the controller 10 finishes the processing procedure shown in FIG. 6. If the controller 10 determines that the vehicle 50 gets close to the predetermined area 100 (Yes in Step S103), the controller 10 proceeds with the processing to Step S104.

The controller 10 of the in-vehicle device 20 acquires the second information as Step S104. For example, the controller 10 acquires the second information indicating a route corresponding to the predetermined area 100 from the route data 9c. For example, the controller 10 may acquire the second information including a direction instruction result and an operation angle of a steering of the vehicle 50 from the other in-vehicle device and the ECU of the vehicle 50 via the communication unit 6.

The controller 10 of the in-vehicle device 20 estimates the scheduled route R of the vehicle 50 in the predetermined area 100 based on the second information as Step S105. For example, the controller 10 determines a guide route of the route data 9c and a route in the predetermined area 100 extracted from the history to be the scheduled route R.

The controller 10 of in-vehicle device 20 generates the third information D for notifying a person getting close to the estimated scheduled route R of the proximity of the vehicle 50 as Step S106. The controller 10 transmits the third information D from the communication unit 6 to the electronic apparatus located outside the vehicle 50 as Step S107. For example, the controller 10 may transmit the third information D to the roadside unit 200 to which the first information has been transmitted. For example, the controller 10 may simultaneously transmit the third information D to the electronic apparatus having the communication function outside the vehicle 50 as a broadcast message. Upon finishing transmitting the third information D, the controller 10 finishes the processing procedure shown in FIG. 6.

Figure 7:
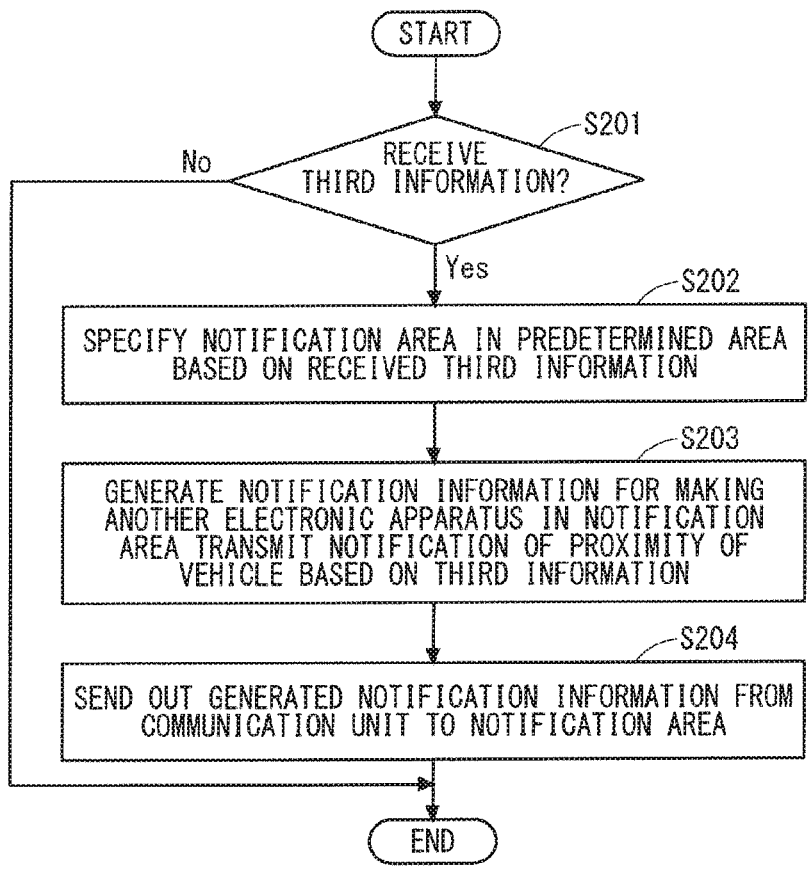
FIG. 7 illustrates a flow chart showing a processing procedure of one example of control performed by the roadside unit.

FIG. 7 is a flow chart showing a processing procedure of one example of control performed by the roadside unit 200. The processing procedure shown in FIG. 7 is achieved when the controller 202 of the roadside unit 200 executes the control program 203a. The processing procedure shown in FIG. 7 is executed repeatedly by the controller 202.

As shown in FIG. 7, the controller 202 of the roadside unit 200 determines whether or not the third information D is received via the communication unit 201 as Step S201. If the controller 202 determines that the third information D is not received (No in Step S201), the controller 202 finishes the processing procedure shown in FIG. 7. If the controller 202 determines that the third information D is received (Yes in Step S201), the controller 202 proceeds with the processing to Step S202.

The controller 202 specifies the notification area E in the predetermined area 100 based on the received third information D as Step S202. For example, the controller 202 determines the area regarding the scheduled route R indicated by the third information D to be the notification area E in the predetermined area 100. For example, specified as the area regarding the scheduled route R is an area including the sidewalk 104 near an area where a travel direction of the vehicle 50 is to be changed in the scheduled route R. The notification area E may be an area along the scheduled route R in the communication area of the communication unit 201 of the roadside unit 200, for example.

The controller 202 generates the notification information for making the other electronic apparatus in the notification area E transmit the notification of the proximity of the vehicle 50 based on the third information D as Step S203. For example, the notification information includes information indicating the scheduled route R and the position of the vehicle 50. The controller 202 sends out the generated notification information from the communication unit 201 to the notification area E as Step S204. Upon finishing sending out the notification information, the controller 202 finishes the processing procedure shown in FIG. 7.

Figure 8:
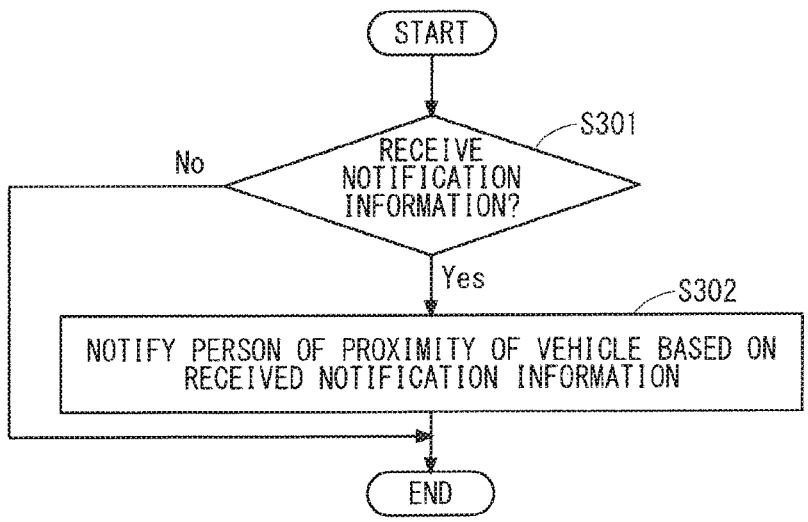
FIG. 8 illustrates a flow chart showing a processing procedure of one example of control performed by the mobile electronic apparatus.

FIG. 8 is a flow chart showing a processing procedure of one example of control performed by the mobile electronic apparatus 300. The processing procedure shown in FIG. 8 is achieved when the controller 10 of the mobile electronic apparatus 300 executes the control program 91. The processing procedure shown in FIG. 8 is executed repeatedly by the controller 10.

As shown in FIG. 8, the controller 10 of the mobile electronic apparatus 300 determines whether or not the notification information is received via the communication unit 6 as Step S301. If the controller 10 determines that the notification information is not received (No in Step S301), the controller 10 finishes the processing procedure shown in FIG. 8. If the controller 10 determines that the notification information is received (Yes in Step S301), the controller 10 proceeds with the processing to Step S302.

The controller 10 of the mobile electronic apparatus 300 notifies the person of the proximity of the vehicle 50 based on the received notification information as Step S302. For example, the controller 10 makes the display 2 display the notification information. For example, the controller 10 makes the speaker 11 output a sound based on the notification information or a notification sound. Upon finishing the notification in accordance with the operation of finishing the notification performed by the person, for example, the controller 10 finishes the processing procedure shown in FIG. 8.

Figure 9:
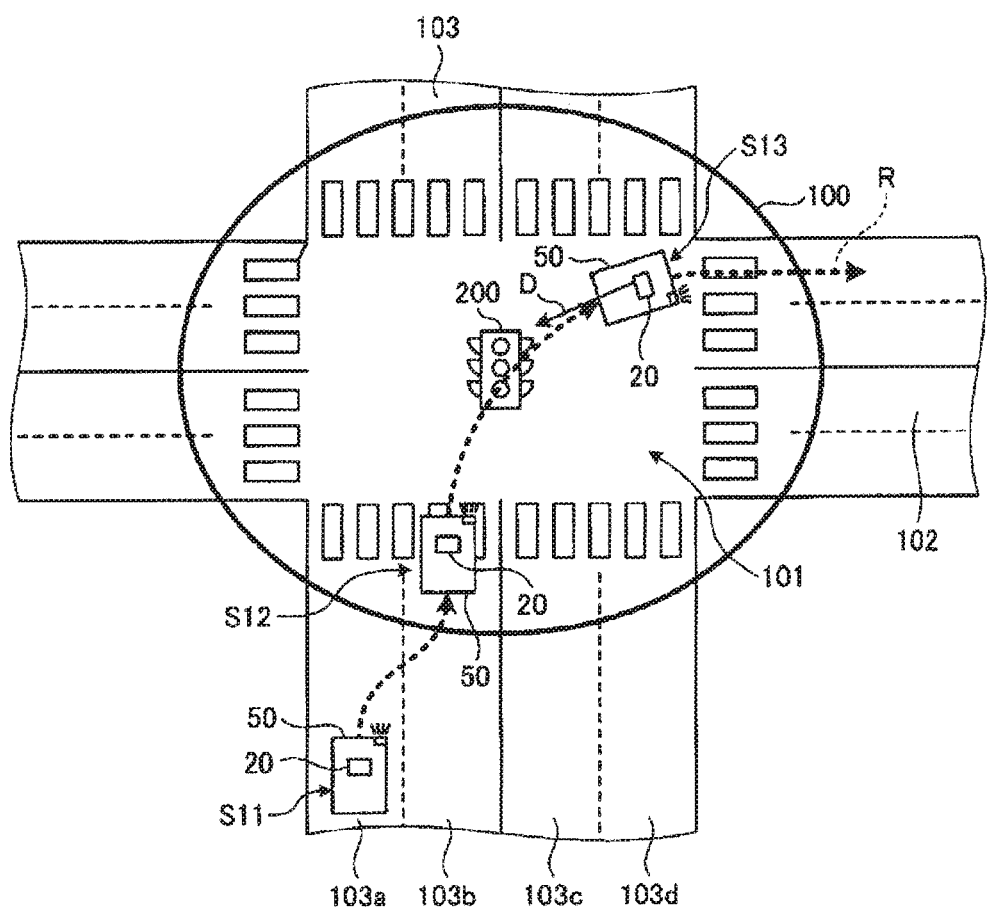
FIG. 9 illustrates a diagram showing another example of the notification method of the notification system in a predetermined area.

FIG. 9 is a diagram showing another example of a notification method of the notification system 1 in the predetermined area 100. In the example shown in FIG. 9, the predetermined area 100 is an area including the intersection 101. The road 102 and the road 103 have a plurality of traffic lanes. The traffic lane indicates a section formed to have a width for one vehicle 50 on the road. In the example shown in FIG. 9, the road 103 has four traffic lanes 103a, 103b, 103c, and 103d. The traffic lanes 103a and 103b indicate traffic lanes directed to one direction in the road 103. The traffic lanes 103c and 103d indicate traffic lanes directed to a direction opposite to that of the traffic lanes 103a and 103b in the road 103. The traffic lane 103a is a traffic lane along which the vehicle 50 can go straight or turn left at the intersection 101. The traffic lane 103b is a traffic lane along which the vehicle 50 can go straight or turn right at the intersection 101.

In the example shown in FIG. 9, the vehicle 50 travels along the traffic lane 103a. In Step S11, when the vehicle 50 gets close to the intersection 101, the driver blinks a direction indicator located on a right side of the vehicle 50. The vehicle 50 makes a lane change from the traffic lane 103a to the traffic lane 103b by a steering operation performed by the driver. In this case, the in-vehicle device 20 determines that the vehicle 50 gets close to the predetermined area 100 (the intersection 101) upon receiving the radio wave from the roadside unit 200. In this case, the in-vehicle device 20 acquires the second information including the information for specifying the traffic lane along which the vehicle 50 travels from the other in-vehicle device and the ECU of the vehicle 50 via the communication unit 6. For example, the second information includes the information indicating a direction instruction result and an operation angle of a steering of the vehicle 50, the information regarding the road 103, and the information regarding the intersection 101. For example, the in-vehicle device 20 may acquire the positional information of the vehicle 50 via the communication unit 6.

In Step S12, the vehicle 50 gets close to the intersection 101 from the traffic lane 103b. In this case, the in-vehicle device 20 estimates the scheduled route R of the vehicle 50 in the predetermined area 100 based on the acquired second information. For example, the in-vehicle device 20 specifies that the vehicle 50 is located on the traffic lane 103b based on the current position of the vehicle 50 and traffic lane information regarding the road 103. For example, the traffic lane information includes a position of the traffic lane, a width of the traffic lane, a directional vector of the traffic lane, and a type of the traffic lane. For example, if the traffic lane 103b is a traffic lane for through traffic or right turn, the in-vehicle device 20 can estimate that the route along which the vehicle 50 turns right at the intersection 101 is the scheduled route R in the predetermined area 100.

In Step S13, the vehicle 50 turns right at the intersection 101 toward the road 102. In this case, the in-vehicle device 20 sends out the third information D for notifying the person getting close to the estimated scheduled route R of the proximity of the vehicle 50 to the roadside unit 200. For example, the third information D includes information indicating the estimated scheduled route R and the current position of the vehicle 50, for example. For example, the in-vehicle device 20 may transmit the third information D to the roadside unit 200 based on identification information received from the roadside unit 200. For example, the in-vehicle device 20 may simultaneously transmit the third information D as a broadcast message.

Upon receiving the third information D from the in-vehicle device 20 of the vehicle 50, the roadside unit 200 determines the notification area E in the predetermined area 100 based on the scheduled route R indicated by the third information D. For example, determined as the notification area E is the area including the sidewalk 104 near the area where the travel direction of the vehicle 50 is to be changed. The roadside unit 200 sends out the radio wave containing the third information D to the determined notification area E.

As described above, in a case where the scheduled route of the vehicle 50 is not previously determined, the notification system 1 can also estimate the scheduled route R in the predetermined area 100 if the in-vehicle device 20 gets close to the predetermined area 100. The notification system 1 can notify the person near the scheduled route R of the proximity of the vehicle 50 using the roadside unit 200. As a result, the notification system 1 previously transmits, using the in-vehicle device 20, the notification of the scheduled route R of the vehicle 50 to the roadside unit 200, thereby being able to contribute to a suppression of an accidental contact between the vehicle 50 and the person. Furthermore, the notification system 1 can use the in-vehicle device which does not have the navigation function, thereby being able to improve general versatility.

The example shown in FIG. 9 describes the case where the in-vehicle device 20 transmits the third information D to the roadside unit 200 when the vehicle 50 starts turning right, however, the configuration of the notification system is not limited thereto. For example, in the example indicated by Step S12, the in-vehicle device 20 cannot specify whether the vehicle 50 goes straight or turns light at the intersection 101 only from the type of the traffic lane 103b. In this case, the in-vehicle device 20 may acquire the direction instruction result of the vehicle 50 as the second information, and estimate the scheduled route R based on the second information.

Figure 10:
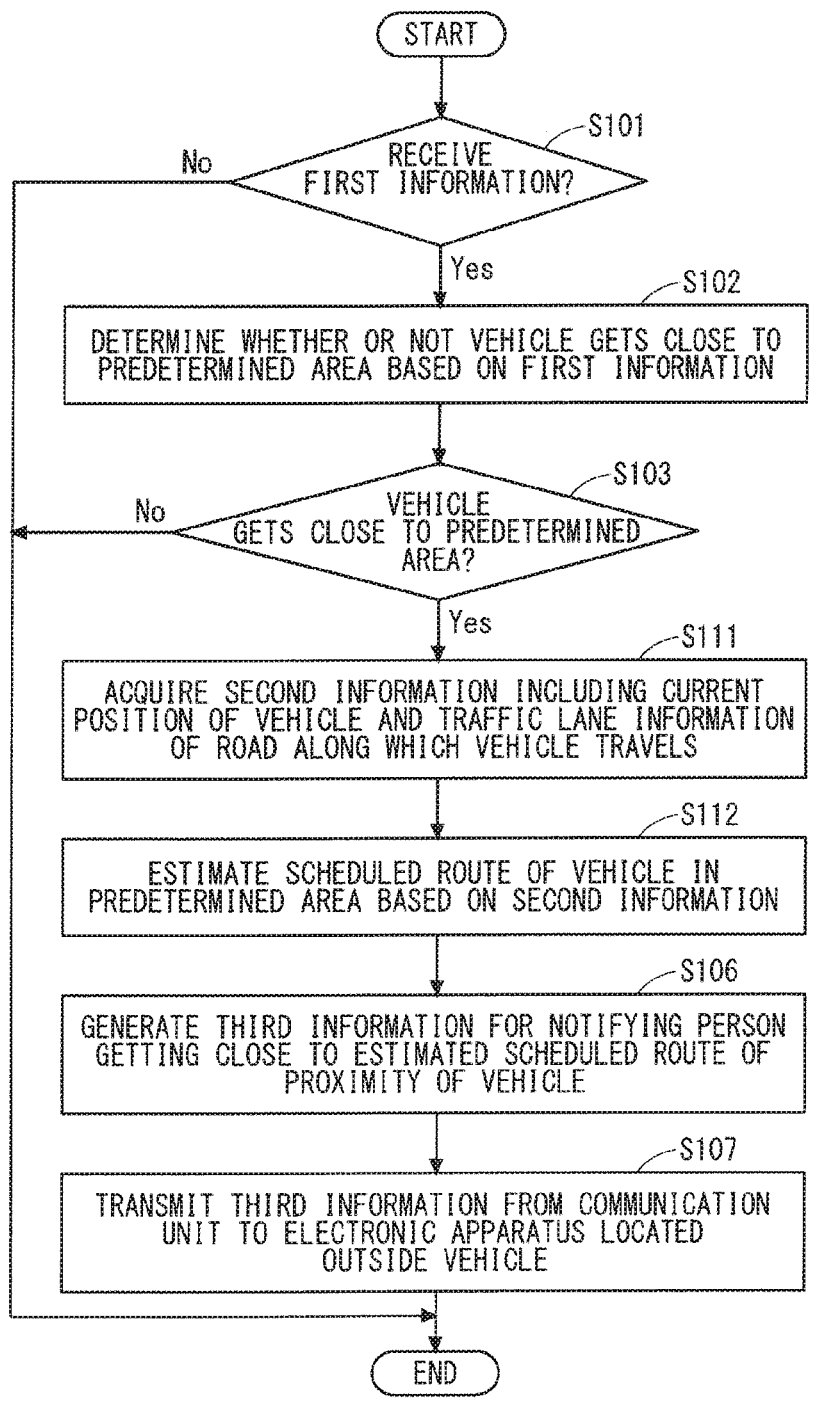
FIG. 10 illustrates a flow chart showing a processing procedure of one example of control performed by the in-vehicle device.

FIG. 10 is a flow chart showing a processing procedure of another example of control performed by the in-vehicle device 20. The processing procedure shown in FIG. 10 is achieved when the controller 10 of the in-vehicle device 20 executes the control program 9a. The processing procedure shown in FIG. 10 is executed repeatedly by the controller 10.

In the example shown in FIG. 10, the processing from Step S101 to Step S103 and from Step S106 to Step S107 is the same as the processing from Step S101 to Step S103 and from Step S106 to Step S107 shown in FIG. 6, thus only different steps are described, and the description of the same steps is omitted.

If the controller 10 of the in-vehicle device 20 determines that the vehicle 50 gets close to the predetermined area 100 (Yes in Step S103), the controller 10 proceeds with the processing to Step S111. The controller 10 acquires the second information including the current position of the vehicle 50 and the traffic lane information of the road along which the vehicle 50 travels as Step S111. For example, the controller 10 acquires the current position of the subject apparatus as the positional information of the vehicle 50 via the communication unit 6. For example, the controller 10 acquires the traffic lane information from the route data 9c or the roadside unit 200. For example, the controller 10 stores the acquired positional information and traffic information in the storage 9 as the second information.

The controller 10 of the in-vehicle device 20 estimates the scheduled route R of the vehicle 50 in the predetermined area 100 based on the second information as Step S112. For example, the controller 10 specifies the traffic lane along which the vehicle 50 travels based on the current position of the vehicle 50 and the traffic lane information. The controller 10 estimates the scheduled route R of the vehicle 50 in the predetermined area 100 based on the specified type of the traffic lane. For example, if the vehicle 50 travels along the right turn lane, the controller 10 estimates the route for right turn in the predetermined area 100 as the scheduled route R. For example, if the vehicle 50 travels along the traffic lane for through traffic or right turn, the controller 10 may estimate the route for right turn in the predetermined area 100 as the scheduled route R to draw the attention of the person located in a position where the vehicle 50 reaches after turning right. Furthermore, the controller 10 may estimate the scheduled route R based on a state of the direction indicator of the vehicle 50. Upon estimating the scheduled route R, the controller 10 executes the processing of Step S106 and the subsequent steps described above.

In the processing procedure shown in FIG. 10, the controller 10 of the in-vehicle device 20 transmits the third information D to the electronic apparatus located outside the vehicle 50 upon estimating the scheduled route R of the vehicle 50, however, the processing procedure is not limited thereto. For example, the controller 10 of the in-vehicle device 20 can change a timing of transmitting the third information D to the electronic apparatus located outside the vehicle 50.

Figure 11:
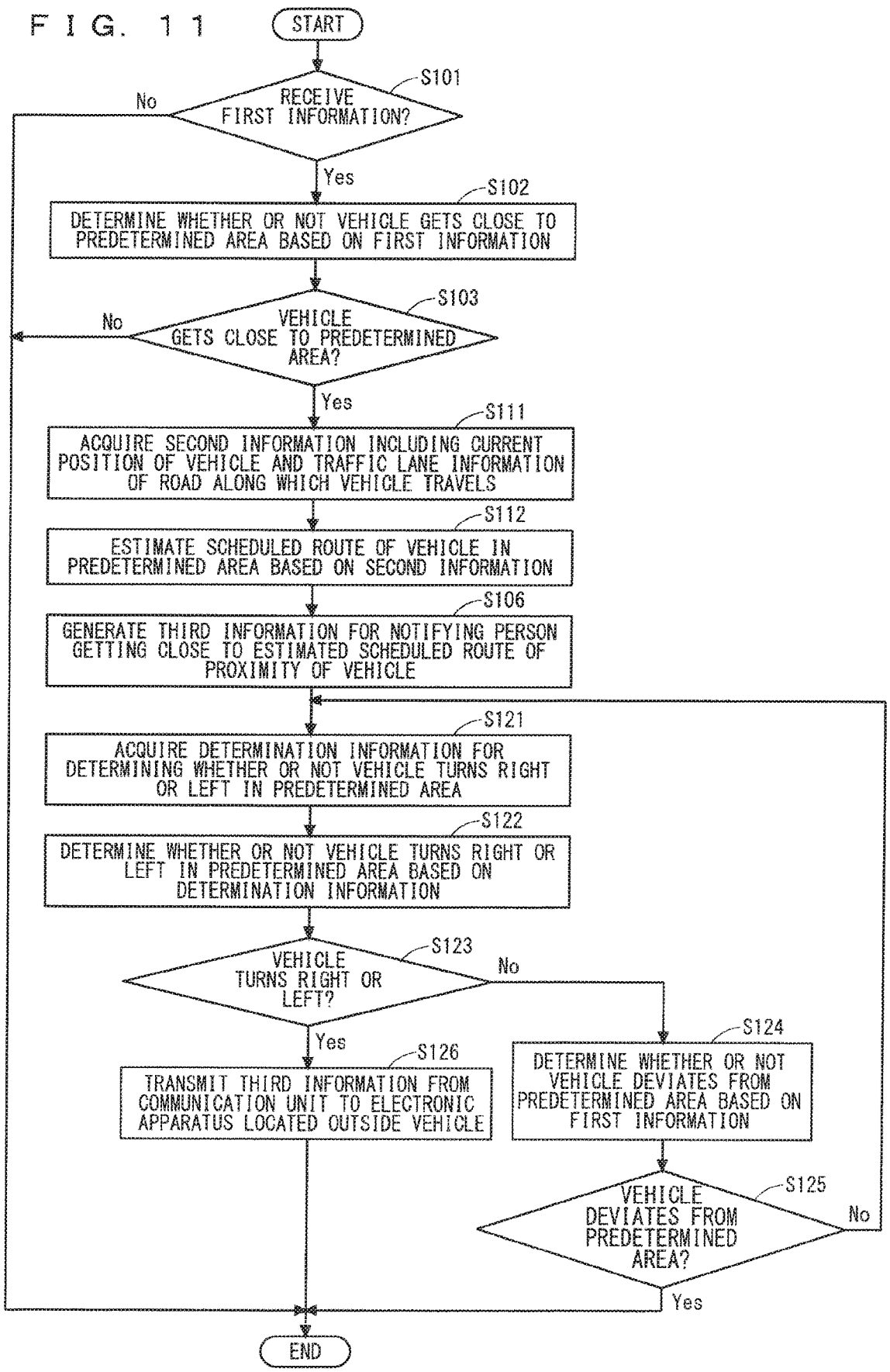
FIG. 11 illustrates a flow chart showing a processing procedure of one example of control performed by the in-vehicle device.

FIG. 11 is a flow chart showing a processing procedure of another example of control performed by the in-vehicle device 20. The processing procedure shown in FIG. 11 is achieved when the controller 10 of the in-vehicle device 20 executes the control program 9a. The processing procedure shown in FIG. 11 is executed repeatedly by the controller 10.

In the example shown in FIG. 11, the processing from Step S101 to Step S103 and Step S106 is the same as the processing from Step S101 to Step S103 and Step S106 shown in FIG. 6. In the example shown in FIG. 11, the processing of Step S111 and Step S112 is the same as the processing of Step S111 and Step S112 shown in FIG. 10. Accordingly, only different steps are described, and the description of the same steps is omitted.

Upon generating the third information D in Step S106, the controller 10 of the in-vehicle device 20 proceeds with the processing to Step S121. The controller 10 acquires determination information for determining whether or not the vehicle 50 turns right or left in the predetermined area 100 as Step S121. For example, the controller 10 acquires the determination information indicating a direction instruction result and an operation angle of a steering of the vehicle 50 and a travel state of the vehicle 50 from the other in-vehicle device and the ECU of the vehicle 50 via the communication unit 6. The travel state of the vehicle 50 includes a state of the vehicle 50 such as a speed and a total number or revolutions of engine, for example.

The controller 10 of the in-vehicle device 20 determines whether or not the vehicle 50 turns right or left in the predetermined area 100 based on the determination information as Step S122. For example, the controller 10 determines that the vehicle 50 turns right or left if the operation angle of the steering is larger than a predetermined angle. If the controller 10 determines that the vehicle 50 does not turn right or left (No in Step S123), the controller 10 proceeds with the processing to Step S124.

The controller 10 of the in-vehicle device 20 determines whether or not the vehicle 50 deviates from the predetermined area 100 based on the first information as Step S124. For example, the controller 10 determines that the vehicle 50 deviates from the predetermined area 100 if the controller 10 does not receive the first information via the communication unit 6. For example, the controller 10 may determine whether the vehicle 50 deviates from the predetermined area 100 based on the current position of the vehicle 50. If the controller 10 determines that the vehicle 50 does not deviate from the predetermined area 100 (No in Step S125), the controller 10 returns the processing to Step S121 described above. If the controller 10 determines that the vehicle 50 deviates from the predetermined area 100 (Yes in Step S125), the controller 10 finishes the processing procedure shown in FIG. 11.

If the controller 10 of the in-vehicle device 20 determines that the vehicle 50 turns right or left (Yes in Step S123), the controller 10 proceeds with the processing to Step S126. The controller 10 transmits the third information D from the communication unit 6 to the electronic apparatus located outside the vehicle 50 as Step S126. For example, the controller 10 may transmit the third information D to the roadside unit 200 to which the first information has been transmitted. For example, the controller 10 may simultaneously transmit the third information D to the electronic apparatus having the communication function outside the vehicle 50 as a broadcast message. Upon finishing transmitting the third information D, the controller 10 finishes the processing procedure shown in FIG. 11.

As described above, if it is determined that the vehicle 50 turns right or left in the predetermined area 100, the in-vehicle device 20 can transmit the third information D to the electronic apparatus located outside the vehicle 50. The notification system 1 can notify the person near the scheduled route R of the proximity of the vehicle 50 using the roadside unit 200 if the vehicle 50 turns right or left. As a result, in the notification system 1, the in-vehicle device 20 transmits the third information D, which is based on the route along which the vehicle 50 travels in the predetermined area 100, to the roadside unit 200, thus an accuracy of the notification to the person can be improved.

Although the above embodiment describes the case where the roadside unit 200 receives the third information D transmitted from the in-vehicle device 20, the notification system 1 is not limited thereto. For example, in the notification system 1, the mobile electronic apparatus 300 may receive the third information D transmitted from the in-vehicle device 20. Described using FIG. 12 is one example of a case where the mobile electronic apparatus 300 directly receives the third information D from the in-vehicle device 20.

Figure 12:
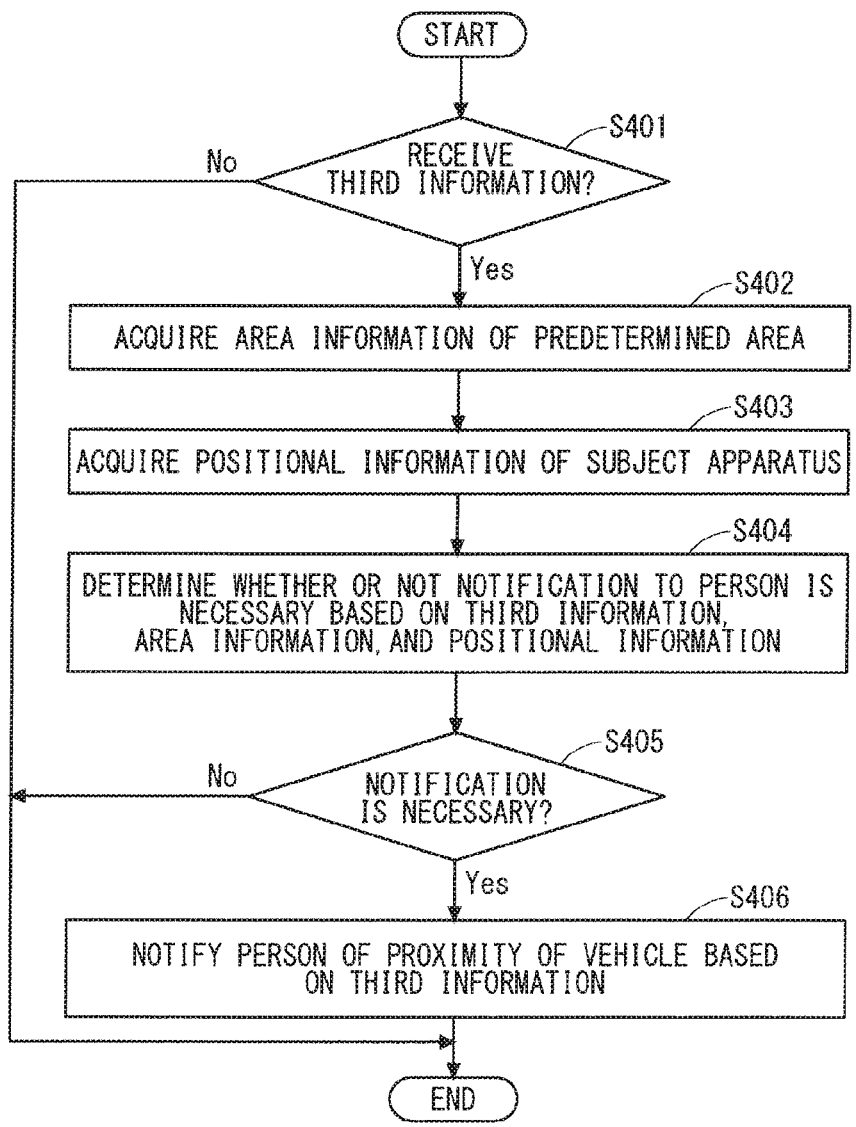
FIG. 12 illustrates a flow chart showing a processing procedure of one example of control performed by the mobile electronic apparatus.

FIG. 12 is a flow chart showing a processing procedure of another example of control performed by the mobile electronic apparatus 300. The processing procedure shown in FIG. 12 is achieved when the controller 10 of the mobile electronic apparatus 300 executes the control program 91. The processing procedure shown in FIG. 12 is executed repeatedly by the controller 10.

As shown in FIG. 12, the controller 10 of the mobile electronic apparatus 300 determines whether or not the third information D is received via the communication unit 6 as Step S401. If the controller 10 determines that the third information D is not received (No in Step S401), the controller 10 finishes the processing procedure shown in FIG. 12. If the controller 10 determines that the third information D is received (Yes in Step S401), the controller 10 proceeds with the processing to Step S402.

The controller 10 of the mobile electronic apparatus 300 acquires area information of the predetermined area 100 as Step S402. For example, the area information includes information regarding the road in the predetermined area 100. For example, the controller 10 acquires the area information from the in-vehicle device 20 or the roadside unit 200 via the communication unit 6. The controller 10 acquires the positional information of the subject apparatus via the communication unit 6 as Step S403. For example, the positional information of the subject apparatus includes a history of movement in the predetermined area 100 and near the predetermined area 100.

The controller 10 of the mobile electronic apparatus 300 determines whether or not the notification to the person is necessary based on the third information D, the area information, and the positional information as Step S404. For example, the controller 10 compares the scheduled route R indicated by the third information D with the position of the person in the predetermined area 100, and determines that the notification is necessary if a distance from the scheduled route R to the position of the person is smaller than a predetermined distance. For example, the controller 10 determines that the notification is necessary if the scheduled route R indicated by the third information D intersect with a travel direction of the person in the predetermined area 100. If the controller 10 determines that the notification is not necessary (No in Step S405), the controller 10 finishes the processing procedure shown in FIG. 12. If the controller 10 determines that the notification is necessary (Yes in Step S405), the controller 10 proceeds with the processing to Step S406.

The controller 10 of the mobile electronic apparatus 300 notifies the person of the proximity of the vehicle 50 based on the third information D as Step S406. For example, the controller 10 makes the display 2 display a notification screen including the scheduled route R of the third information D. For example, the controller 10 makes the speaker 11 output a sound for the notification of the proximity of the vehicle 50 or a notification sound. Upon finishing the notification in accordance with the operation of finishing the notification performed by the person, for example, the controller 10 finishes the processing procedure shown in FIG. 12.

As described above, upon receiving the third information D transmitted from the in-vehicle device 20, the mobile electronic apparatus 300 can notify the person of the proximity of the vehicle 50 if it is determined that the notification to the person is necessary. In the notification system 1, the in-vehicle device 20 and the mobile electronic apparatus 300 directly communicate with each other, thereby being able to reduce a load on the roadside unit 200. The mobile electronic apparatus 300 determines the necessity of the notification to the person, thereby being able to improve the accuracy of the notification to the person.

In the embodiment described above, the in-vehicle device 20 may be achieved by a smartphone carried by the driver, for example. In this case, the in-vehicle device 20 may detect a rotation direction and a rotation angle of the steering of the vehicle 50 using the sensor 15. For example, the in-vehicle device 20 may be mounted on the vehicle 50 with being held by the user.

The above embodiment describes the case where the notification system 1 comprises the in-vehicle device 20, the roadside unit 200, and the mobile electronic apparatus 300, however, the configuration of the notification system 1 is not limited thereto. For example, the in-vehicle device 20 may be achieved by a plurality of ECUs of the vehicle 50. For example, the vehicle 50 may achieve the communication unit 6 and the controller 10 of the in-vehicle device 20 by a communication ECU or a display ECU controlling a display in the vehicle 50. The notification system 1 may be configured to comprise only the in-vehicle device 20 and the roadside unit 200. In this case, the roadside unit 200 can comprise a notification unit capable of transmitting a notification to the notification area E, thereby transmitting a notification to the person using the notification unit.

The above embodiment describes the case where in the notification system 1, the in-vehicle device 20 estimates the scheduled route R of the vehicle 50 in the predetermined area 100, however, the configuration of the notification system 1 is not limited thereto. For example, it is also applicable that the in-vehicle device 20 transmits the second information, the information regarding the in-vehicle device 20, and the information regarding the vehicle 50 to a cloud server located outside the in-vehicle device 20 via the communication unit 6, and the cloud server estimates the scheduled route R of the vehicle 50 in the predetermined area 100. For example, the notification system 1 may achieve part of the function of the roadside unit 200 by the cloud server.

The art of appended claims has been described with respect to specific embodiments for a complete and clear disclosure. However, the appended claims are not to be thus limited but are to be construed as embodying all modifications and alternative constructions that may occur to one skilled in the art which fairly fall within the basic teaching herein set forth.

The invention claimed is:

1. An in-vehicle device, comprising:
a transceiver configured to receive first information for detecting proximity of a vehicle including the in-vehicle device to a predetermined area; and
at least one processor configured to, in a case that the processor detects that the vehicle is located within a predetermined proximity of the predetermined area based on the first information:
acquire second information indicating a schedule of changing a travel direction of the vehicle;
estimate a route along which the vehicle travels in the predetermined area based on the second information; and
cause the transceiver to transmit third information specifying the estimated route of the vehicle in the predetermined area to an electronic apparatus located outside the vehicle, the third information for notifying a person getting close to the estimated route of the vehicle of the proximity of the vehicle, wherein
the third information specifying the estimated route of the vehicle in the predetermined area includes turn data specifying any turns that the vehicle is estimated to make within the predetermined area, and
the second information used to estimate the route along which the vehicle travels in the predetermined area includes information indicating an instruction state of a direction indicator of the vehicle.

2. The in-vehicle device according to claim 1, further comprising
storage storing route data, the route data indicating a route acquired by a navigation program for guiding the vehicle from a start point to a destination, wherein
the second information used to estimate the route along which the vehicle travels in the predetermined area further includes information acquired from the stored route data.

3. The in-vehicle device according to claim 1, wherein
the second information used to estimate the route along which the vehicle travels in the predetermined area further includes information indicating a current position of the vehicle and information indicating a traffic lane along which the vehicle travels.

4. The in-vehicle device according to claim 3, wherein
the at least one processor is further configured to:
acquire determination information for determining whether the vehicle makes a right or left turn in the predetermined area; and
cause the transceiver to transmit the third information to the electronic apparatus located outside the vehicle, only upon determining that the vehicle makes the right or left turn in the predetermined area.

5. A vehicle, comprising:
a transceiver configured to receive first information for detecting proximity of the vehicle to a predetermined area; and
at least one processor configured to, in a case that the processor detects that the vehicle is located within a predetermined proximity of the predetermined area based on the first information:
acquire second information indicating a schedule of changing a travel direction of the vehicle;
estimate a route along which the vehicle travels in the predetermined area based on the second information; and
cause the transceiver to transmit third information specifying the estimated route of the vehicle in the predetermined area to an electronic apparatus located outside the vehicle, the third information for notifying a person getting close to the estimated route of the vehicle of the proximity of the vehicle, wherein
the third information specifying the estimated route of the vehicle in the predetermined area includes turn data specifying any turns that the vehicle is estimated to make within the predetermined area, and
the second information used to estimate the route along which the vehicle travels in the predetermined area includes information indicating an instruction state of a direction indicator of the vehicle.

6. A notification system, comprising:
an in-vehicle device mounted on a vehicle; and
a roadside unit located in or near a predetermined area and configured to communicate with the in-vehicle device, wherein
the in-vehicle device comprises:
a first transceiver configured to receive first information for detecting proximity of the vehicle to the predetermined area; and
at least one first processor configured to, in a case that the at least one first processor detects that the vehicle is located within a predetermined proximity of the predetermined area based on the first information:
acquire second information indicating a schedule of changing a travel direction of the vehicle;
estimate a route along which the vehicle travels in the predetermined area based on the second information; and
cause the transceiver to transmit third information specifying the estimated route of the vehicle in the predetermined area to the roadside unit, wherein
the third information specifying the estimated route of the vehicle in the predetermined area includes turn data specifying any turns that the vehicle is estimated to make within the predetermined area, and
the second information used to estimate the route along which the vehicle travels in the predetermined area includes information indicating an instruction state of a direction indicator of the vehicle, and
the roadside unit comprises:
a second transceiver configured to receive the third information from the in-vehicle device; and
at least one second processor configured to execute notification processing based on the third information, wherein
in the notification processing, the at least one second processor is configured to:
based on the third information, specify an area along the estimated route of the vehicle where a travel direction of the vehicle is scheduled to change, as a notification area in the predetermined area, and
cause the second transceiver to broadcast to the notification area, information for making a mobile electronic apparatus in the notification area transmit a notification of a proximity of the vehicle to a user of the mobile electronic apparatus.

7. A notification method performed by an in-vehicle device comprising a transceiver mounted on a vehicle, the notification method comprising:

receiving first information, from the transceiver, for detecting proximity of the vehicle to a predetermined area;

determining, on the basis of the first information, whether the vehicle is located within a predetermined proximity of the predetermined area; and in a case that the vehicle is located within the predetermined proximity of the predetermined area:
  acquiring second information indicating a schedule of changing a travel direction of the vehicle;
  estimating a route along which the vehicle travels in the predetermined area based on the second information; and
  causing the transceiver to transmit third information specifying the estimated route of the vehicle in the predetermined area to a roadside unit located in or near the predetermined area, the third information being used by the roadside unit to specify an area along the estimated route of the vehicle where a travel direction of the vehicle is scheduled to change as a notification area within the predetermined area, the notification area being an area to which the roadside unit broadcasts information for making a mobile electronic apparatus transmit a notification of a proximity of the vehicle to a user of the mobile electronic apparatus, wherein the third information specifying the estimated route of the vehicle in the predetermined area includes turn data specifying any turns that the vehicle is estimated to make within the predetermined area, and the second information used to estimate the route along which the vehicle travels in the predetermined area includes information indicating an instruction state of a direction indicator of the vehicle.

\* \* \* \* \*